(12) United States Patent
Vitkin et al.

(10) Patent No.: US 11,763,199 B2
(45) Date of Patent: *Sep. 19, 2023

(54) TIME-SERIES DATA UNCERTAINTY REDUCTION

(71) Applicant: INTERNATIONAL BUSINESS MACHINES CORPORATION, Armonk, NY (US)

(72) Inventors: Edward Vitkin, Yoqneam Ilit (IL); Igor Kostirev-Kronos, Adamit (IL); Alex Melament, Kiriat Mozkin (IL); Yardena Lia Peres, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/128,201

(22) Filed: Dec. 21, 2020

(65) Prior Publication Data

US 2021/0110216 A1 Apr. 15, 2021

Related U.S. Application Data

(63) Continuation of application No. 16/534,582, filed on Aug. 7, 2019.

(51) Int. Cl.
    G06N 20/00 (2019.01)
    G06F 18/2415 (2023.01)
    G06F 18/21 (2023.01)

(52) U.S. Cl.
    CPC ............ *G06N 20/00* (2019.01); *G06F 18/21* (2023.01); *G06F 18/2415* (2023.01); *G06F 2218/00* (2023.01)

(58) Field of Classification Search
    CPC ............ G06K 9/6277; G06K 9/00496; G06K 9/6217; G06K 9/00523; G06K 9/00536; G06N 20/00
    (Continued)

(56) References Cited

U.S. PATENT DOCUMENTS 5,083,206 A * 1/1992 Knauer ................. H04N 19/61
                                                   375/240.1
5,974,457 A   10/1999 Waclawsky et al.
(Continued)

FOREIGN PATENT DOCUMENTS

WO   2013051101 A1   3/2015

OTHER PUBLICATIONS

Kadous, M. W. et al., "Classification of multivariate time series and structured data using constructive induction." Machine Learning 58.2 (2005), pp. 179-216.
(Continued)

*Primary Examiner* — Stephen P Coleman
(74) *Attorney, Agent, or Firm* — CUENOT, FORSYTHE & KIM, LLC

(57) ABSTRACT

Time-series data uncertainty reduction can include generating an initial accumulated signal based on an event classifier prediction score. The event classifier prediction score can be generated by an event predicator based on time-series data and can correspond to a probability that a target event occurs. Signal leakage can be imposed on the initial accumulated signal. Additionally, an alert can be generated in response to determining that the initial accumulated signal is greater than an alert threshold.

7 Claims, 5 Drawing Sheets

(58) Field of Classification Search
USPC .......................................................... 706/12
See application file for complete search history.

(56) References Cited

U.S. PATENT DOCUMENTS

| | | | |
|---|---|---|---|
| 7,711,734 B2 | 5/2010 | Leonard | |
| 8,723,694 B1* | 5/2014 | Finley | B64D 45/00 |
| | | | 340/691.4 |
| 2015/0020207 A1* | 1/2015 | Kasiviswanathan | |
| | | | G06F 21/554 |
| | | | 726/26 |
| 2016/0164721 A1 | 6/2016 | Zhang et al. | |
| 2021/0042587 A1 | 2/2021 | Vitkin et al. | |

OTHER PUBLICATIONS

Frank, J. et al., "Activity and gait recognition with time-delay embeddings," Proc. of the 24th AAAI Conf. on Artificial Intelligence (AAI-2010), 2010, 6 pg.

Garcia, D., "A fast all-in-one method for automated post-processing of PIV data," Experiments in Fluids, 2011, 50(5), pp. 1247-1259.

Fiscus, J.G. "A post-processing system to yield reduced word error rates: Recognizer output voting error reduction (ROVER)," Proc. of IEEE Workshop on Automatic Speech Recognition and Understanding, 1997, 8 pg.

Scargle, J.D. et al. "Studies in astronomical time series analysis, VI. Bayesian Block Representations," The Astrophysical Journal, 764.2 (2013), 82 pg.

Büchler, M. et al. "Sound classification in hearing aids inspired by auditory scene analysis," EURASIP Journal on Advances in Signal Processing 2005:18 , pp. 2991-3002.

Wald, A., "Sequential Tests of Statistical Hypotheses," The Annals of Mathematical Statistics, 16 (2): pp. 117-186, Jun. 1945.

Kulldorff, M. et al., "A Maximized Sequential Probability Ratio Test for Drug and Vaccine Safety Surveillance" Sequential Analysis, 30(1), 2011, pp. 58-78.

Turksoy, K. et al., "Hypoglycemia Early Alarm Systems Based On Multivariable Models," Industrial & Engineering Chemistry Research. Sep. 4, 2013, 52(35), 19 pg.

Cameron, F. et al. "Statistical Hypoglycemia Prediction," Journal of Diabetes Science and Technology, Jul. 2008, 2(4), pp. 612-621.

Kuleshov, V., "Accurate Uncertainties for Deep Learning Using Calibrated Regression," Proceedings of the 35th International Conference on Machine Learning, Stockholm, Sweden, PMLR 80, 2018, 9 pg.

IBM: List of IBM Patents or Patent Applications Treated as Related, 2 pg.

Vitkin, E. et al., "Time-Series Data Uncertainty Reduction", U.S. Appl. No. 16/534,582, filed Aug. 7, 2019, 30 pages.

* cited by examiner

TIME-SERIES DATA UNCERTAINTY REDUCTION

BACKGROUND

The present disclosure relates to the field of signal processing, and more particularly, to processing signals expressing time-series data.

Time-series data is a set of observations or other datapoints arranged chronologically. Time-series data is generated in connection with very diverse phenomena and very many fields of endeavor and research. Examples of phenomena measured and analyzed with time-series data include, for example: blood sugar levels of a monitored patient; internal noise of an electronic transceiver; daily rainfall in a given city; ambient noise level at a given time in the ocean; atmospheric turbulence gust velocities; daily stock market prices; and a host of other phenomena observed periodically or continuously over time.

SUMMARY

A method can include generating an initial accumulated signal based on an event classifier prediction score. The event classifier prediction score can be generated by an event predictor based on time-series data and can correspond to a probability that a target event occurs. The method also can include imposing signal leakage on the accumulated signal. Additionally, the method can include generating an alert in response to determining that the initial accumulated signal is greater than an alert threshold.

A system includes a computer having at least one processor programmed to initiate executable operations. The executable operations can include generating an initial accumulated signal based on an event classifier prediction score. The event classifier prediction score can be generated by an event predictor based on time-series data and can correspond to a probability that a target event occurs. The executable operations also can include imposing signal leakage on the accumulated signal. Additionally, the executable operations can include generating an alert in response to determining that the initial accumulated signal is greater than an alert threshold.

A computer program product includes a computer-readable storage medium in which is stored program code, the program code executable by computer hardware to initiate operations. The operations can include generating an initial accumulated signal based on an event classifier prediction score. The event classifier prediction score can be generated by an event predictor based on time-series data and can correspond to a probability that a target event occurs. The operations also can include imposing signal leakage on the accumulated signal. Additionally, the operations can include generating an alert in response to determining that the initial accumulated signal is greater than an alert threshold.

DETAILED DESCRIPTION

Figure 1:
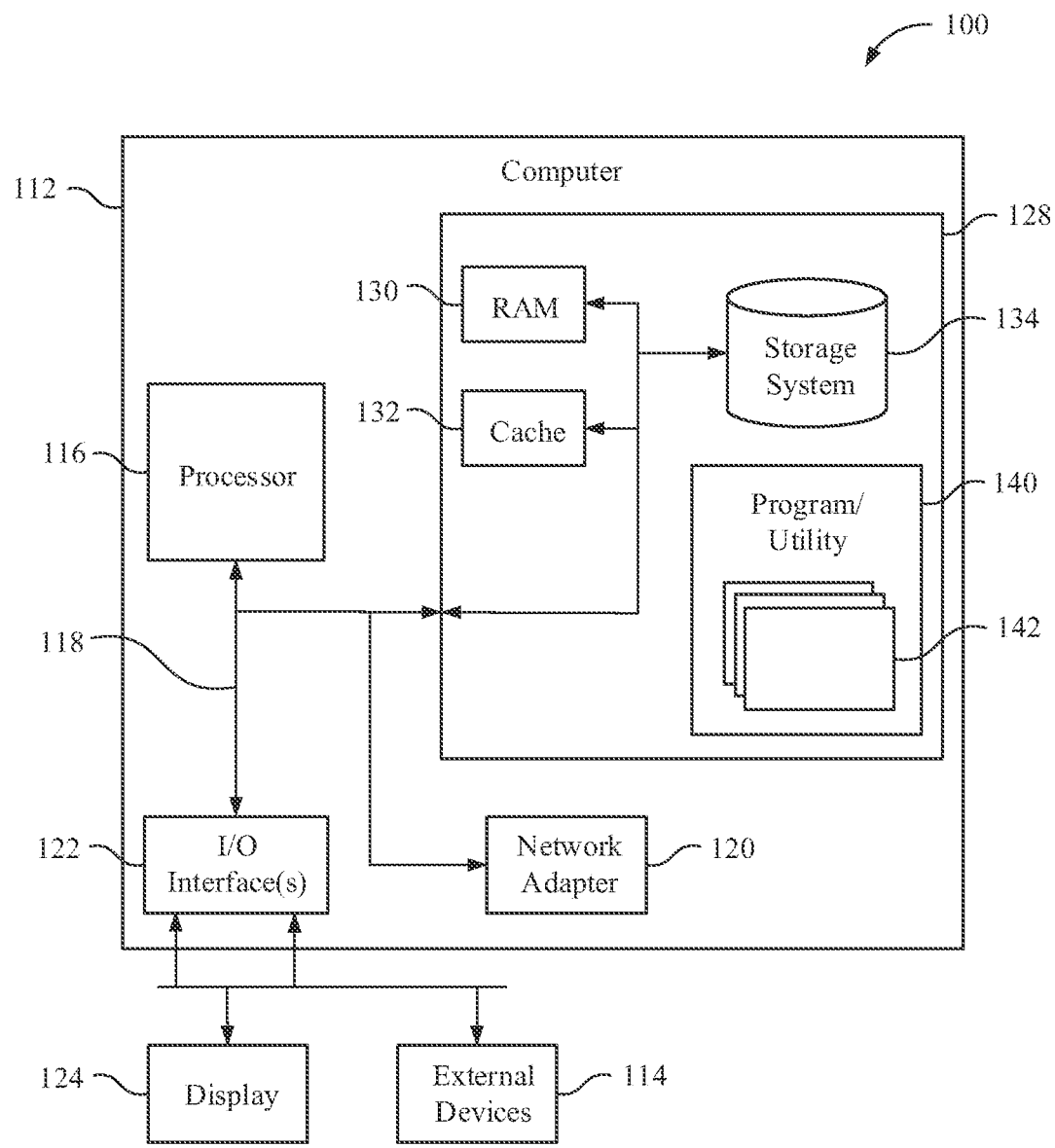
FIG. 1 depicts a computing environment in which a system for time-series data uncertainty reduction can be implemented according to an embodiment of the present invention.

Time-series data is often generated by a sensor that responds to physical stimuli such as heat, sound, pressure, motion, magnetism, electrostatic charge, electromagnetic radiation, chemical reactions, or many other phenomena, and in response, transmits a signal (e.g., impulse) used for measurement or control. Different types of systems can generate and analyze time-series data based on signals received from an external sensor. Time-series data is generated not only in response to physical stimuli, however. For example, time-series data also includes social and economic data such as recorded prices of securities (e.g., stocks, bonds, options, derivatives, and other financial instruments) traded daily on a security exchange or prices of wheat traded on a commodities exchange.

Based on the analysis of time-series data, a system can recognize specific time-based patterns of data points. The system can classify time-based patterns of data points, or even a single data point. The system can generate probabilities (e.g., event probabilities) indicating the likelihood of a specific event (e.g., a hypoglycemic or other event in a system-monitored patient) occurring based on recognizing and classifying patterns of data points.

Predicting an event with high confidence in the face of time-series data uncertainty may require not only simple counting (e.g., sum of event probabilities), but also an alignment of complex, possibly arbitrary, heuristic rules. Such rules reflect the fact that a high-confidence prediction may require receiving over an extended time period a sequence of event probabilities consistently higher than average. Design requirements and cost constraints may necessitate that a system not respond too readily, such as by issuing an alert prematurely. A time-based constraint may be needed to prevent the system from generating an alert more than once within a predetermined interval, T. Such constraints, however, should not prevent the system from generating an alert in response to a high-confidence prediction.

Post-processing based on set rules is often used to balance these competing, and sometimes conflicting, objectives of a system dealing with time-series data uncertainty. Rule-based approaches, however, can require that complex, possibly heuristic, rules be devised and implemented. Moreover, implementing a rules-based approach typically requires using a greater share of the system's memory and processing resources to implement the rules and to store and manage the event histories that are fundamental to time-series analysis. The added demands on system resources can also significantly limit system scalability.

These and other challenges are addressed by the systems, methods, and computer program products disclosed herein for mitigating time-series data uncertainty. The systems, methods, and computer program products disclosed herein can reduce time-series data uncertainty without reliance on complex or heuristic rules, thus obviating the need to define and manage rules, as well as the need to store and manage event histories.

The systems, methods, and computer program products disclosed herein generate a series of signals corresponding to event classifier prediction scores generated by an event predictor (e.g., classifier model) based on time-series data. The event classifier prediction scores can represent event probabilities, that is, probabilities that a predefined target event occurs at a specific time or within a given time interval. The event classifier prediction scores can be generated based on input that the event predictor receives from an external sensor. As new event classifier prediction scores based on time-series data are received from the event predictor, the corresponding signals accumulate the event classifier prediction scores. The signals, accordingly, are accumulated signals. As defined herein, an "accumulated signal" is a signal that accumulates (e.g., sums) a series of scores (e.g., event classifier prediction scores) that are generated over a time interval and that represent event probabilities generated by an event predictor based on time-series data. Consistent with the chronological nature of time-series data on which the accumulated signals are based, each accumulated signal can be indexed by time, t.

Two properties inherent in the operations performed according to the systems, methods, and computer program products disclosed herein are an accumulation property and a limited-memory property. Intuitively, if event classifier prediction scores are higher than normal (e.g., long-term average) for several time points, then the likelihood of the target event's occurrence is correspondingly greater. The accumulation property ensures that the accumulation signals increase if corresponding event classifier prediction scores are consistently higher than normal over a certain time period. The limited-memory property ensures that if higher-than-normal scores are followed by below-normal scores, then the accumulated signals are reduced accordingly to ensure that previously high event classifier prediction scores are ignored if the event classifier prediction scores are out of date. The limited-memory property is implemented by imposing signal leakage on the accumulated signals. As defined herein, "signal leakage" is a reduction applied to an accumulated signal. Signal leakage can be applied at a variable rate to ensure that above-normal accumulated signal levels that occurred too far in the past do not unduly affect initial accumulated signals or result in a premature triggering of a predetermined threshold.

An alert threshold can be set such that if an accumulated signal exceeds the threshold, an alert is triggered to indicate a high probability of occurrence of a target event. The accumulation property ensures that the alert is triggered if the accumulated signals increase in response to event classifier prediction scores that are higher than average for several time points. The limited-memory property ensures that the alert is triggered only if the accumulated signals are not out of date, that is, that there was not a period of below-average accumulated signals (corresponding to below-average event classifier prediction scores) before the threshold was reached.

FIG. 1 depicts computing system 100, which according to one embodiment, can be used to implement time-series data uncertainty reduction. Illustratively, computing system 100 includes computer 112, which is operational with numerous other general-purpose and special-purpose computing system environments or configurations. Examples of well-known computing systems, environments, and/or configurations that are suitable for use with computer 112 include, but are not limited to, personal computers, servers, thin clients, thick clients, hand-held or laptop devices, multiprocessor systems, microprocessor-based systems, set top boxes, programmable consumer electronics, network PCs, minicomputers, mainframe computers, and distributed computing environments that include any of the above systems or devices, and the like. Moreover, computer 112 is only one example of a system or device for implementing time-series data uncertainty reduction. Other devices can include, for example, dual-use devices such as smartphones, which combine communication capabilities and computing capabilities, and dedicated devices having computing capabilities (e.g., CPU within a sensor). In various embodiments, time-series data uncertainty reduction can be implemented in other devices and computer hardware.

Referring still to FIG. 1, computer 112 can be described in the general context of computer system-executable instructions, such as program modules, that can be executed by a computer or computing system. Generally, program modules can include routines, programs, objects, components, logic, data structures, and so on that perform specific tasks or implement particular abstract data types. Computer 112 can be practiced in distributed computing environments where tasks are performed by remote processing devices that are linked through a communications network. In a distributed computing environment, program modules can be located in both local and remote computer system storage media including memory storage devices.

As shown in FIG. 1, computer 112 of computing system 100 is illustratively a general-purpose computing device. The components of computer 112 can include, but are not limited to, processor 116, memory 128, and bus 118 which operatively couples various system components including memory 128 to processor 116.

Processor 116 can comprise one or more cores that read and execute program instructions (processor-executable code) concurrently. For example, processor 116 can comprise four or eight cores, where each core can separately execute multiple instructions of programs specifically designed for parallel processing and drawn from various application domains, including general-purpose applications and specific-purpose applications such as digital signal processing.

Memory 128 can include computer-readable media in the form of volatile memory, such as random-access memory (RAM) 130 and/or cache memory 132. Computer 112 can further include other removable/non-removable, volatile/non-volatile computer storage media. By way of example, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 can include at least one program product having a set (e.g., at least one) of program modules that are configured to carry out the functions of embodiments of the described.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe).

Computer 112 can include a variety of computer-readable media. Such media can be any available media that is accessible by computer 112, and includes both volatile and non-volatile media, removable and non-removable media.

Program/utility 140, having a set (at least one) of program modules 142, can be stored in memory 128. By way of example, and not limitation, program modules 142 can include an operating system, one or more application programs, other program modules, and program data. Each of the operating system, one or more application programs, other program modules, and program data or some combination thereof, can include an implementation of a networking environment. Program modules 142 generally carry out the functions and/or methodologies of embodiments described herein.

One or more of the program modules can include various embodiments of a system, or portions thereof, for performing time-series data uncertainty reduction, as disclosed herein. Program/utility 140 is executable by processor 116. Program/utility 140 and any data items used, generated, and/or operated upon by computing system 100 are functional data structures that impart functionality when employed by the computing system. As defined herein, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 112 can also communicate with one or more external devices 114 such as a keyboard, a pointing device, a display 124, etc.; one or more devices that enable a user to interact with computer 112; and/or any devices (e.g., network card, modem, etc.) that enable computer 112 to communicate with one or more other computing devices. Such communication can occur via Input/Output (I/O) interfaces 122. Computer 112 can communicate with one or more networks such as a local area network (LAN), a general wide area network (WAN), and/or a public network (e.g., the Internet) via network adapter 120. As depicted, network adapter 120 communicates with the other components of computer 112 via bus 118. It should be understood that although not shown, other hardware and/or software components could be used in conjunction with computer 112. Examples include, but are not limited to, the following: microcode, device drivers, redundant processing units, external disk drive arrays, RAID systems, tape drives, and data archival storage systems.

Figure 2:
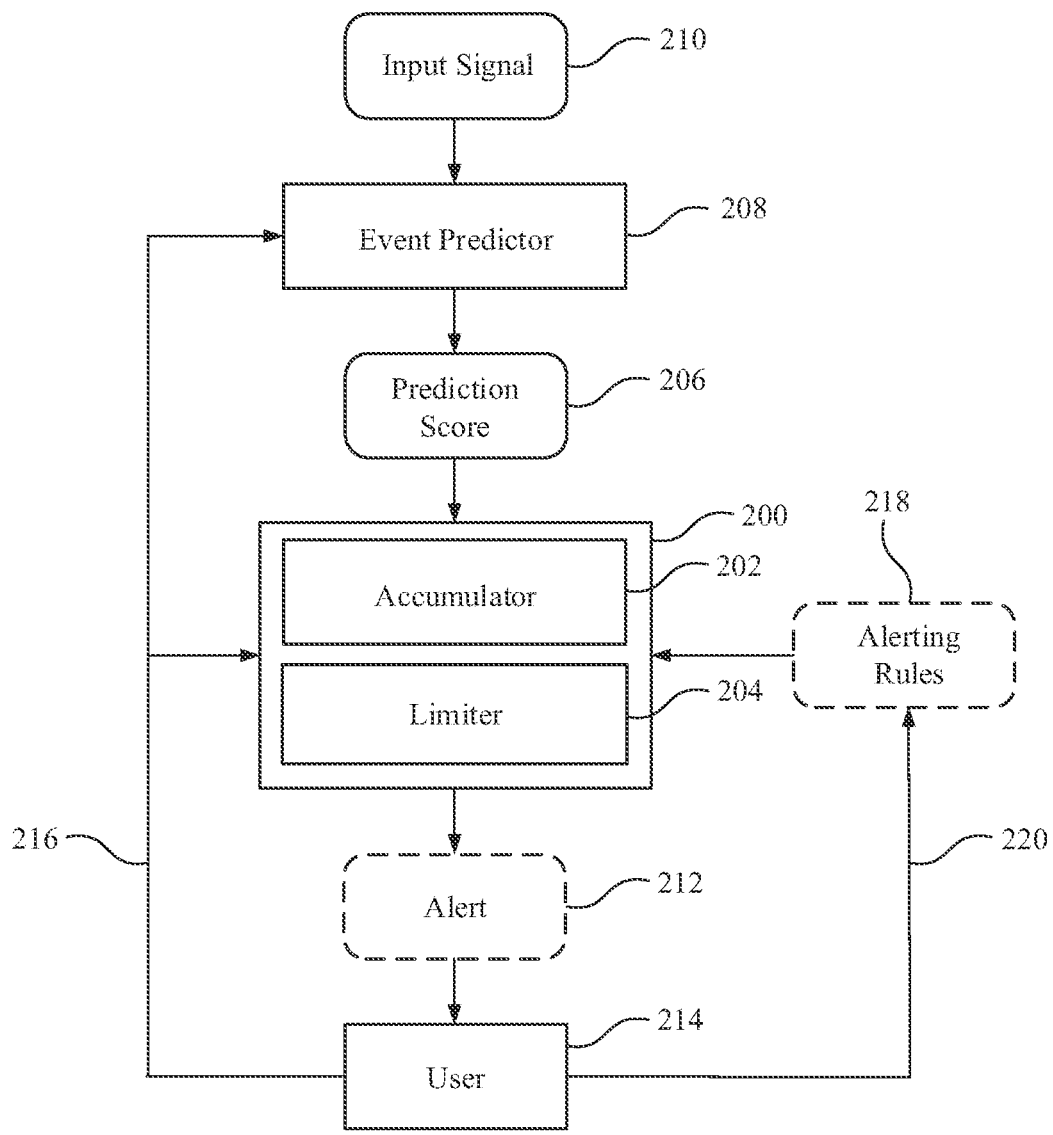
FIG. 2 depicts elements of a system for time-series data uncertainty reduction according to an embodiment of the present invention.

Referring additionally now to FIG. 2, system 200 for reducing uncertainty in time-series data according to one embodiment is depicted. System 200 illustratively includes accumulator 202 and limiter 204. System 200 (including accumulator 202 and limiter 204) is illustratively implemented as processor-executable code (e.g., program module) stored in memory 128 and executable on processor 116 when conveyed from the memory to the processor via bus 118. System 200, in other embodiments, can be implemented as hardwired circuitry in other types of devices (e.g., patient monitoring device). With any devices that have code-processing capabilities, system 200 can be implemented as a combination of circuitry and processor-executable code. Such devices include patient monitoring systems, process monitoring systems, systems for monitoring data such as financial data, and the like.

Illustratively, system 200 implemented as processor-executable code residing on computer 112 can operatively link with event predictor 208, which also can be implemented as processor-executable code residing on the same computer. In different embodiments, system 200 and event predictor 208 can operate within a single computer or single device, or alternatively, on separate computers or devices that are communicatively coupled to one another. Event predictor 208, residing on computer 112, can communicatively couple to an external sensor (not shown) to receive input signal 210 from the external sensor. The external sensor, for example, can respond to physical stimuli (e.g., medical monitor such as blood glucose monitor). Input signal 210 conveys time-series data that event predictor 208 analyzes according to various types of models. Analysis and model types may include various classification and regression models (e.g., hidden Markov models, recurrent and convolutional neural networks, different types of regressions, random forests, SVM and etc.). Based on a specific model, event predictor 208 generates a time-based event classifier prediction score 206 at discrete points or continuously over a specified time period. Event classifier prediction score 206 specifies an event probability, which indicates the likelihood of a target event occurring. A target event can be, for example, a physical event forthcoming or experienced by a patient (e.g., expected hypoglycemic event).

Event classifier prediction score 206 is conveyed to system 200. Typically, monitoring for a target event occurs over an extended period, during which multiple event classifier prediction scores are generated by event predictor 208 and conveyed to system 200. For example, with respect to a patient monitor, a new event classifier prediction score may be generated at intervals (e.g., every 5 minutes) indicating the likelihood of a patient event occurring within a specific time period (e.g., within 4 hours).

With each new event classifier prediction score 206 received by system 200 at a time t, accumulator 202 generates an accumulated signal. A time t accumulated signal combines a newly received event classifier prediction score at time t with previous event classifier prediction scores received at time t−1 and earlier. As accumulator 202 generates accumulated signals with each newly received event classifier prediction score, limiter 204 imposes signal leakage on accumulated signals that are at or above a predetermined level, the normal (long-term) accumulated signal level. The normal (long-term) accumulated signal level can be determined, for example, as a long-term average for the specific process from which the time-series data is derived.

Signal leakage maintains accumulated signals at an average level if newly added event classifier prediction scores are at the average level. Signal leakage also brings accumulated signals that are higher than the average level, as a result of higher than average level event classifier prediction scores, back to the average level if higher-than-average event classifier prediction scores are followed by below average scores before reaching a predetermined maximum threshold level. Signal leakage thus mitigates or eliminates the effects of higher-than-average event classifier prediction scores that are out of date, that is, event classifier prediction scores that occurred too much earlier in a specific time period to be any longer reliable for predicting an occurrence of the target event.

Specifically, accumulator 202 in conjunction with limiter 204 performs the following operations. If at time t, final accumulated signal $S_{t-1}$, determined at t−1, is greater than or equal to normal (long-term) accumulated signal level $\beta_{NORM}$, ($S_{t-1} \geq \beta_{NORM}$), then a signal leakage rate, $\lambda(t)$, is determined as $$\lambda(t) = \begin{cases} \lambda_{NORM}, \text{ if } (Ypred_t > \lambda_{NORM}) \text{ OR } (S_{t-1} = \beta_{NORM}) & \text{(Eq. 1.1a)} \\ (1+\varepsilon_\lambda)*\lambda(t-1), \text{ otherwise} & \text{(Eq. 1.1b)} \end{cases}$$

and initial accumulated signal $C_t$ is determined as $$C_t = \max\{\alpha_{prev}*S_{t-1} + \alpha_{curr}*Ypred_t - \lambda(t), \beta_{NORM}\} \quad \text{(Eq. 1.2)}$$

Otherwise, if $S_{t-1} < \beta_{NORM}$, initial accumulated signal $C_t$ is determined as $$C_t = \alpha_{prev}*S_{t-1} + \alpha_{curr}*Ypred_t \quad \text{(Eq. 1.3)}$$

where $Ypred_t$ is the event classifier prediction score at time t; $C_t$ is the initial accumulated signal at time t; $S_t$ is the final accumulated signal at time t; $\lambda(t)$ is the signal leakage rate at time t; $\alpha_{prev} \geq 0$ and $\alpha_{curr} \geq 0$ are relative weights for the prior final accumulated signal and current event classifier prediction score, respectively; $\beta_{NORM} \geq 0$ is the normal (long-term) accumulated signal level; $\varepsilon_\lambda$ is a leakage intensity increment factor (the greater the factor, the faster system "forgets" older, out of date accumulated signals); and $\lambda_{NORM}$ is the normal leakage rate.

If initial accumulated signal $C_t$ is above an alert threshold level, $\theta$, then an alert is triggered. The following alert function, $A_t$, determines whether an alert is triggered at time t (alert triggered if $A_t=+1$, no alert triggered if $A_t=-1$):

$$A_t = -1 + 2*I_{[C_t \geq \theta]} \quad \text{(Eq. 2)}$$

where $I_{[C_t \geq \theta]}$ is an indicator function, and $\theta$ is the predetermined alert threshold:

$$I_{[C_t \geq \theta]} \begin{cases} 1, \text{ if } C_t \geq \theta \\ 0, \text{ otherwise} \end{cases}.$$

The final level of the accumulated signal at time t, $S_t$, is determined as follows:

$$S_t = \beta_{MIN}*I_{[C_t \geq \theta]} C_t*(1 - I_{[C_t \geq \theta]}) \quad \text{(Eq. 3)}$$

where $\beta_{MIN}$ is an after-alert minimal signal level.

As expressed in Eq 1.1a through Eq. 3, the operations begin with system 200 receiving event classifier prediction score 206 from event predictor 208. Accumulator 202 initially determines whether the prior final accumulated signal at time t−1 was greater than or equal to the normal (long-term) accumulated signal level. If so, then limiter 204 imposes signal leakage. Limiter 204 determines the current time t leakage rate (Eq. 1.1a and Eq. 1.1b). If either (1) the time t event classifier prediction score is greater than the normal (long-term) leakage rate or (2) the t−1 final accumulated signal is equal to the normal (long-term) accumulated signal level, then the time t signal leakage rate is set equal to the normal leakage rate (Eq. 1.1a). Otherwise, the time t signal leakage rate is set equal to one plus the increment in leakage intensity times the t−1 signal leakage rate (Eq. 1.1b).

With the time t signal leakage rate determined as above, accumulator 202 determines the time t initial accumulated signal with reference to the time t signal leakage rate (Eq. 1.2) The time t initial accumulated signal is set equal (1) a weighted sum of the t−1 final accumulated signal plus the time t event classifier prediction score minus the time t signal leakage rate or (2) the normal (long-term) accumulated signal level, depending on which is greater (Eq. 1.2).

If accumulator 202 determines that the final accumulated signal at time t−1 was not greater than or equal to the normal (long-term) accumulated signal level, then limiter 204 does not impose signal leakage. The time t initial accumulated signal, with no leakage imposed, is then set equal to a weighted sum of the t−1 final accumulated signal plus the time t event classifier prediction score (Eq. 1.3).

Accumulator 202 determines whether system 200 issues an alert at time t based upon the time t initial accumulated signal. If the time t initial accumulated signal is greater than or equal to the alert threshold, then the alert function yields +1 (Eq. 2), and, in response, the system generates alert 212 that the system conveys to user 214. If the time t initial accumulated signal is less than the alert threshold, then the alert function yields −1 (Eq. 2), in which event the system does not generate an alert.

Accumulator 202 generates a final accumulated signal at time t. The time t final accumulated signal depends on whether the initial accumulated signal at time t is greater than or equal to the alert threshold. If the time t initial accumulated signal is greater than or equal to the alert threshold, then the alert is issued (Eq. 2), and the time t final accumulated signal is set equal to the after-alert minimal signal level (Eq. 3). Otherwise, the final accumulated signal at time t is set equal to the time t initial accumulated signal (Eq. 3).

Figure 3:
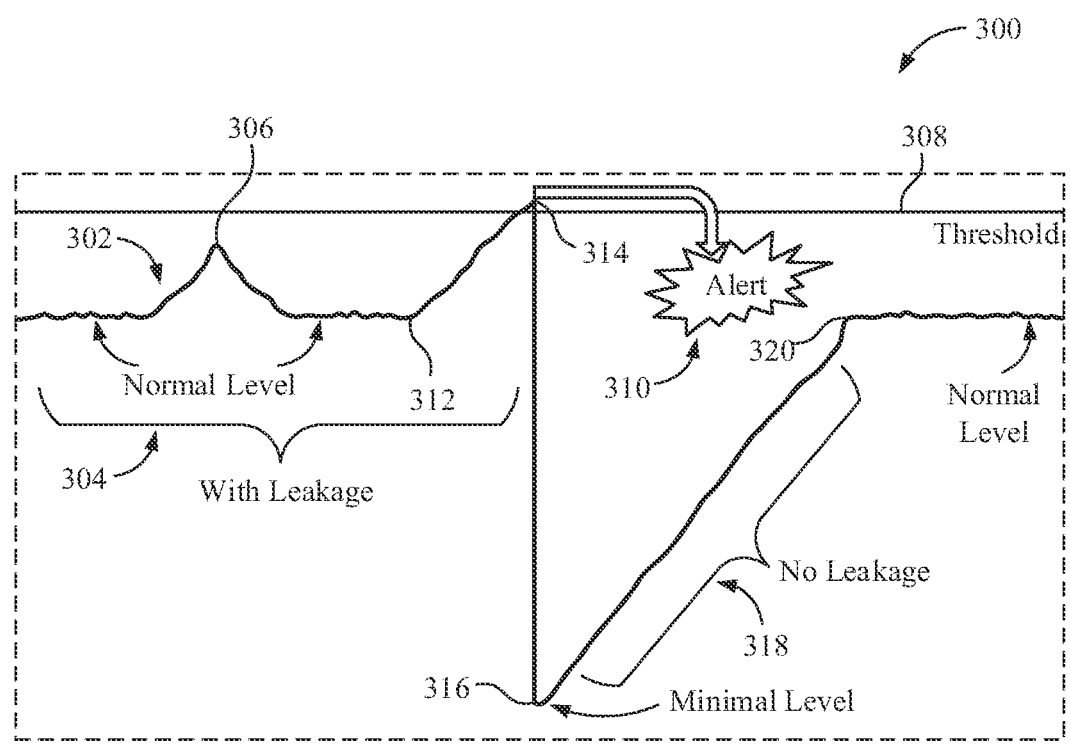
FIG. 3 depicts certain operative features of a time-series data uncertainty reduction system according to an embodiment of the present invention.

Referring additionally now to FIG. 3, certain operative features 300 of system 200 are illustrated. Accumulated signals 302 correspond to the event classifier prediction scores that are generated by event predictor 208 and conveyed to system 200. Initially at a normal (long-term) accumulated signal level, signals 302 are subject to system-imposed signal leakage. Signal leakage is imposed over range 304. Although signals 302 are cumulative, the system-imposed signal leakage maintains accumulated signals corresponding to normal (long-term) event classifier prediction scores at the normal (long-term) accumulated signal level. Within range 304, accumulated signals 302 exhibit a rise (in response to higher-than-normal event classifier prediction scores) that peaks at 306. If in response to higher-than-average event classifier prediction scores the accumulated signals rise, but do not rise to the threshold level before lower-than-average event classifier scores are received, then signal leakage brings the accumulated signals back to the normal (long-term) accumulated signal level. This is illustrated by the accumulated signal declines after the accumulated signals peak at 306 without reaching the threshold 308. The system optionally can accelerate signal leakage when the accumulated signal level increases over the normal level and the currently received signal is below leakage value (Eq 1.1b). The effect is to return the accumulated signals 302, post-peak, to the normal (long-term) accumulated signal level more quickly. The results demonstrate the limited-memory property that signal leakage imposes on system 200.

Note that although the accumulated signal peaked 306 before threshold level 308 was reached, the density of high signals within a period of interest was insufficient to trigger alert 310. Were the signal leakage not imposed, the accumulated signals would have remained high even though the higher-than-normal event classifier prediction scores were followed by below-normal event classifier prediction scores. If the accumulated scores remained at peak 306, then when accumulated signals began to rise anew at 312 (or even earlier) the rise would have been from the previously attained level (peak 306), causing the scores to exceed threshold 308 earlier despite the intervening time period during which the event classifier prediction scores were declining. The limited-memory property prevents accumulated scores reaching the threshold 308 and triggering the alert prematurely.

Once the threshold is reached at 314, after a sufficiently dense period of high accumulated signals, the alert 310 is triggered, and the system reduces the accumulated signal to the after-alert minimal level at 316. The system imposes no signal leakage over the range 318, and the accumulated signal level rises. The accumulated signal level reaches the normal (long-term) accumulated signal level at 320, and the system renews imposing signal leakage.

For example, assume a score of 1 corresponds to an event probability of 10%, a score of 2 corresponds to an event probability of 20%, and so on. Assume also that score 1 (10% probability) is the "normal" probability of a target event occurring within time t; that is, there is some positive probability of the event occurring with time t that is considered normal. Initially, the score is set to 1. A sequence of scores of 0 and 1 will maintain the accumulated signal level at the normal 1 (leakage does not reduce the signal below the normal 1). Assume, next, a sequence of scores of 1 are received (that is, each a normal score). Each score of 1 yields an accumulated signal of 2 (that is, to the initial normal score 1 is added another normal score 1, yielding an accumulated score of 2), but after leakage, the score remains 1. Leakage maintains the score at normal (accumulated signal 2, less leakage 1) indicating that the event probability is still only 10%). At each data point, the accumulated signal less leakage thus remains at the normal level. This is leakage maintaining the accumulated signal at normal level.

Now suppose the event probability (the probability of occurrence of the target event within time t) doubles, yielding a score of 2. Assume that this happens for three data points, yielding an accumulated score of 6. Each 2 is accumulated subject to leakage of 1. Thus, (1+2−1=2), followed by (2+2−1=3), followed by (3+2−1=4). Assume the sequence of accumulated signals (2, 3, 4) peaks at 4.

If alert threshold is 5, then a 4 does not trigger the alert. Assume, that below normal scores (zero) are now received (that is, without accumulated signal having reached the threshold of 5). Each zero is accumulated subject to leakage of 1 as long as the accumulated signal is still above normal: (0+4−1=3), followed by (0+3−1=2), followed by (0+2−1=1). Leakage brings accumulated signals (based on below average scores) back to normal. Based on the assumed parameters, the earlier above-normal scores are out of date, after the sequence of below-normal scores are received, and essentially are discarded. Moreover, this numerical example can be extended according to the above equations using different values. For example, in view of Eq. 1.1b, this numerical example can be extended to encompass other results with different values of $\varepsilon_\lambda$. If $\varepsilon_\lambda \geq 1$, for example, then in this numerical example the second leakage will be $\geq 2$. Thus, a sequence of two consecutive zero score values will suffice to return the accumulated score at the normal value.

If now the same sequence of ones is repeated, but with one additional above-normal score received (sequence is 2, 3, 4, 5), then the signal does not peak at 4, but instead rises to 5. The accumulated signal thus reaches the threshold and triggers the alarm.

Referring still to FIG. 2, user 214 can optionally convey performance-modifying feedback 216 to system 200 and/or event predictor 208. Because the operations performed by system 200 are largely dictated by the above-described parameters, system performance can be modified by changing the parameter values. For example, adjustment of parameters $\alpha_{prev}$, $\alpha_{curr}$, $\beta_{MIN}$, and $\beta_{NORM}$ can dictate a minimum time gap between successive alerts by controlling how rapidly accumulated signals return to the normal (long-term) level after dropping to $\beta_{MIN}$, the after-alert minimal signal level. Increasing leakage intensity increment factor, $\varepsilon_\lambda$, and adjusting the $\alpha_{prev}$ and $\alpha_{curr}$ and $\beta_{NORM}$ parameters, for example, can cause the system 200 to forget older, out of date accumulated signals faster. Alerting rules 218 optionally can be incorporated and modified based on feedback 220 from user 214. For example, the alerting rules can specify a minimal value for high-confidence predictor output that triggers an immediate alert, the length of inter-alert intervals, and/or be structured to preclude inordinate numbers of "false positives" and "false negatives."

Merely by changing values of one or more of the parameters ($\alpha_{prev}$, $\alpha_{curr}$, $\beta_{MIN}$, $\beta_{NORM}$, $\varepsilon_\lambda$, $\lambda_{NORM}$, and $\theta$) the same system 200 can switch from one time-series uncertainty reduction task to another. In one embodiment, different sets of parameter values can be stored in the memory of the specific device in which system 200 operates, and the system can automatically, or in response to a user command, switch back and forth intermittently to performing uncertainty reduction tasks on different event classifier prediction scores based on different time-series data using the different sets of parameters. For example, with respect to patient monitoring, the same system can operate with one set of parameters on event classifier prediction scores for predicting a hypoglycemic event based on blood sugar levels and then switch to a different set of parameters to operate on event classifier prediction scores for predicting cardiac events based on time-series data generated by an electrocardiogram. In various embodiments, system 200 can switch between tasks using different parameter values automatically in response to a signal (e.g., generated by event predictor 208 or an external sensor).

Figure 4:
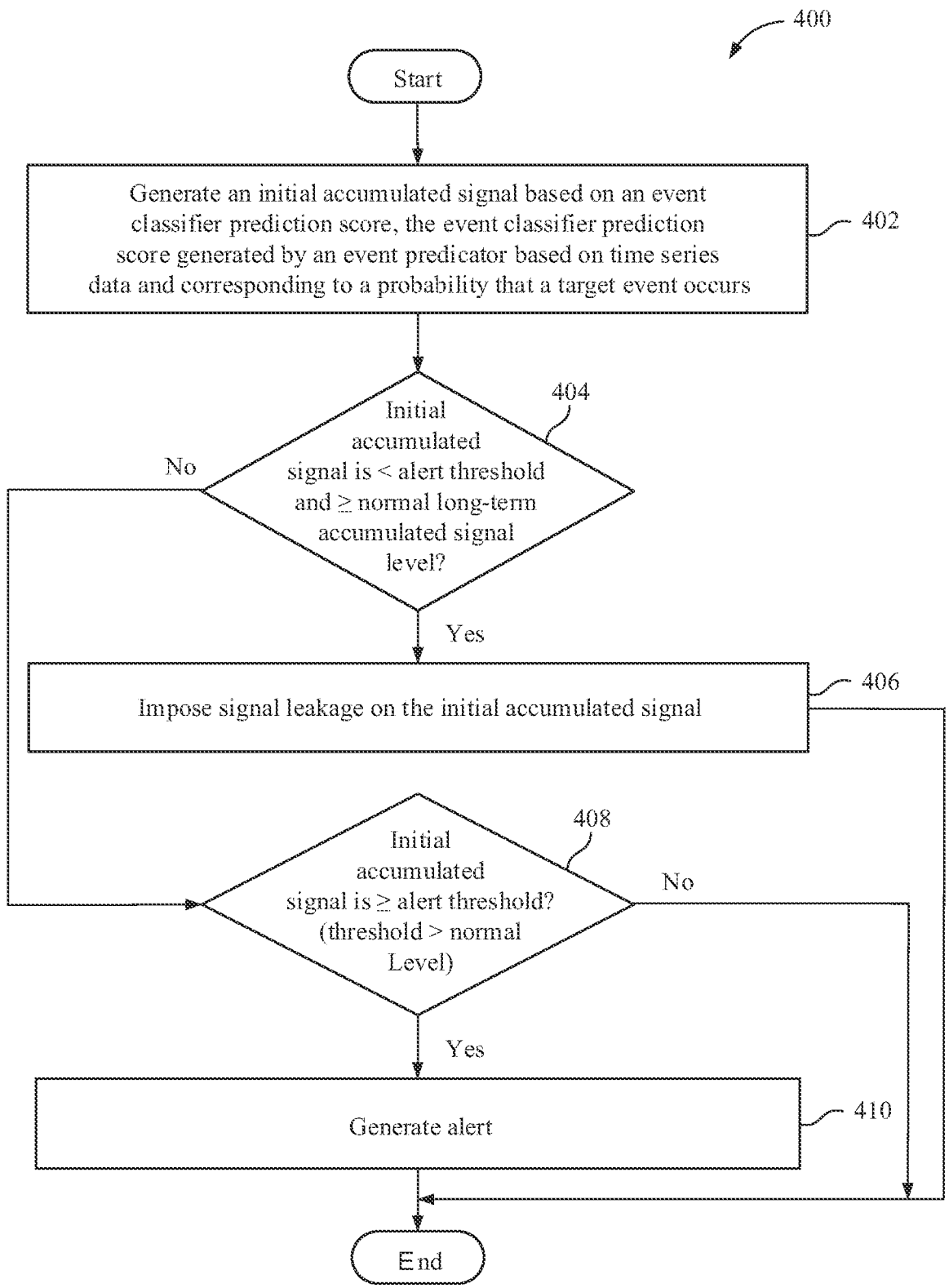
FIG. 4 is a flowchart of a method of time-series data uncertainty reduction according to one embodiment of the present invention.

FIG. 4 is a flowchart of method 400 of time-series data uncertainty reduction according to one embodiment. Method 400 can be performed by a system the same as or similar to the system described in reference to FIGS. 1-3. The method can begin with the system receiving an event classifier prediction score, the event classifier prediction score generated by an event predicator based on time-series data and corresponding to a probability that a target event occurs. At 402, the system generates an initial accumulated signal based on the event classifier prediction score.

If at 404 the system determines that the initial accumulated signal is less than an alert threshold but greater than or equal to a normal (long-term) accumulated signal level, then the system imposes signal leakage on the initial accumulated signal at 406. Otherwise, the system at 408 determines whether the initial accumulated signal is greater than or equal to the alert threshold (the alert threshold being greater than the normal (long-term) accumulated signal level). If so, then the system generates an alert at 410.

The event predictor can generate event classifier prediction scores using various models and methods to analyze time-series data, including statistical analysis and models (e.g., hidden Markov model, regression analysis) and models trained using machine learning algorithms (e.g., recurrent neural network for time-series analysis) for classifying data. The time-series data analyzed can be generated by various types of sensors, including sensors that respond to physical stimuli (e.g., medical monitors, such as blood glucose monitors).

In a particular embodiment, generating the initial accumulated signal and imposing signal leakage in response to determining that the prior accumulated signal is greater than or equal to the normal (long-term) accumulated signal level but less that the alert threshold can include determining a signal leakage rate (see Eq. 1.1a and Eq. 1.1b) and computing a weighted sum of the prior accumulated signal and the event classifier prediction score and the signal leakage rate (see Eq. 1.2). The initial accumulated signal is set equal to the weighted sum if the weighted sum is greater than the normal (long-term) accumulated signal level and is set equal to the normal (long-term) accumulated signal level if the normal (long-term) accumulated signal level is greater than the weighted sum (see Eq. 1.2).

The signal leakage rate can be set equal to a predetermined normal leakage rate if either the event classifier prediction score is greater than the predetermined normal leakage rate or the prior accumulated signal is greater than the normal (long-term) accumulated signal level (see Eq. 1.1a). The signal leakage rate can be set equal to a prior signal leakage rate times one plus a leakage intensity factor if the event classifier prediction score is not greater than the predetermined normal leakage rate and the prior accumulated signal is not greater than the normal (long-term) accumulated signal level (see Eq. 1.1b).

If the prior final accumulated signal at t−1 is less than the normal (long-term) accumulated signal level, then no signal leakage is imposed on the time t initial accumulated signal. When no signal leakage is imposed, the initial accumulated signal is computed as a weighted sum of the prior accumulated signal and the event classifier prediction score (see Eq. 1.3).

Figure 5:
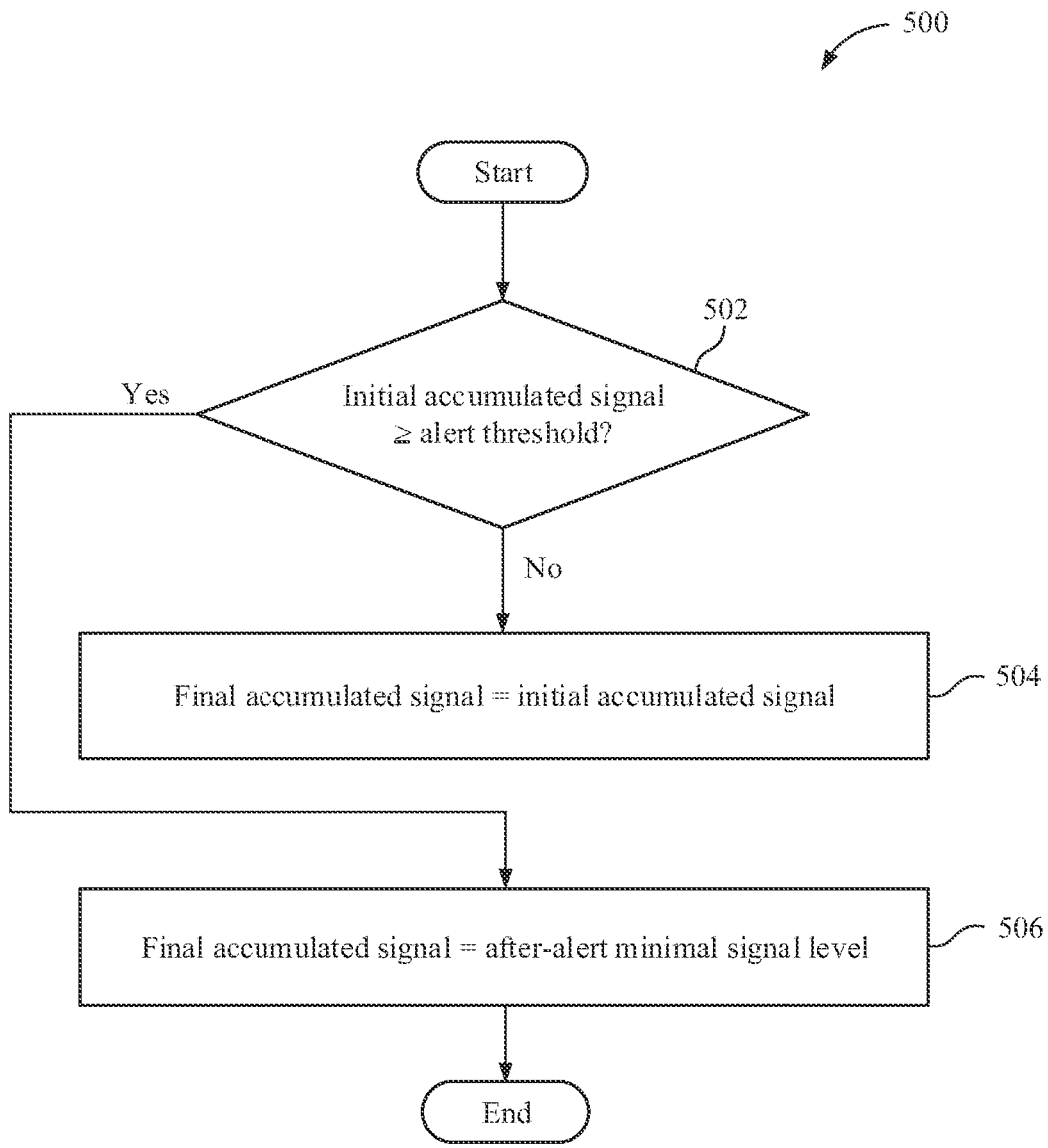
FIG. 5 is a flowchart of a method of time-series data uncertainty reduction according to one embodiment of the present invention.

Referring additionally now to FIG. 5, a flowchart of the generation of a final accumulated signal, according to one embodiment, is depicted. Initially at 502, the system determines whether the initial accumulated signal is greater than or equal to the alert threshold. If not, then at 504 the final accumulated signal is set equal to the initial accumulated signal. If, however, the initial accumulated signal is greater than or equal to the alert threshold, then at 506 the final accumulated signal is set equal to the after-alert minimal signal level (see Eq. 3). Because there will be an ensuing time gap before the accumulated signals—now not subject to signal leakage—rise again to the normal (long-term) accumulated signal when the system resumes imposing signal leakage, there will be an inevitable time period before another alert will be triggered. The system thus automatically ensures that no two alerts are triggered too close in time to one another. For example, in certain types of patient monitoring a time gap between consecutive alerts may need to be imposed. The system not only ensures that no two alerts are triggered too close in time to one another, but also enables a user to vary the time gap by adjusting the system parameters as described above.

While the inventive aspects of this disclosure have been described primarily in the context of time-series data generated by stimuli-responsive sensors, it will be clear to one skilled in the art that the same methods apply in various other contexts. The same methods, for example, can apply to non-sensor time-series data, such as financial and other non-sensor time-series data. The same methods can also apply to time-series data generated by sensors that do not rely explicitly on stimuli, such as time-series data generated by audio sensors.

Methods of time-series data uncertainty reduction can be implemented as a computer program product at any possible technical detail level of integration. The computer program product can include a computer readable storage medium (or media) having computer readable program code stored therein, the program code executable by computer hardware to initiate operations including those described herein.

The computer readable storage medium can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination thereof. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on a user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform the operations described herein.

Certain embodiments described herein are described with reference to flowchart illustrations and/or block diagrams of methods, apparatus (systems), and computer program products. It is expressly noted and is to be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In certain other implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special-purpose, hardware-based systems that perform the specified functions or acts or carry out combinations of special purpose hardware and computer instructions.

FIGS. 1-5 are conceptual illustrations allowing for a full explanation of the embodiments described. Notably, the figures and examples above are not meant to limit the scope of the disclosure to a single embodiment, as other embodiments are possible by way of interchange of some or all of the described or illustrated elements. Moreover, where certain elements can be partially or fully implemented using known components, only those portions of such known components that are necessary for an understanding of the disclosure are described, and detailed descriptions of other portions of such known components are omitted so as not to obscure the described embodiments. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the disclosure encompasses present and future known equivalents to the known components referred to herein by way of illustration.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    generating, using computer hardware, an initial accumulated signal based on an event classifier prediction score, the event classifier prediction score generated by an event predictor based on time-series data and corresponding to a probability that a target event occurs;
    imposing, using the computer hardware, signal leakage on the initial accumulated signal; and
    generating, using the computer hardware, an alert in response to determining that the initial accumulated signal is greater than an alert threshold.

2. The method of claim 1, wherein
    the imposing signal leakage is responsive to determining that a prior accumulated signal is greater than or equal to a normal (long-term) accumulated signal level and less than the alert threshold.

3. The method of claim 2, wherein
    the generating the initial accumulated signal and the imposing signal leakage in response to determining that the prior accumulated signal is greater than or equal to the normal (long-term) accumulated signal level comprises:
    determining a signal leakage rate and computing a weighted sum of the prior accumulated signal and the event classifier prediction score and the signal leakage rate;
    setting the initial accumulated signal equal to the weighted sum in response to determining the weighted sum is greater than the normal (long-term) accumulated signal level; and
    setting the initial accumulated signal equal to the normal (long-term) accumulated signal level in response to determining the normal (long-term) accumulated signal level is greater than the weighted sum.

4. The method of claim 3, wherein
    the determining the signal leakage rate comprises:
    setting the signal leakage rate equal to a predetermined normal leakage rate in response to determining that the event classifier prediction score is greater than the predetermined normal leakage rate or that the prior accumulated signal is equal to the normal (long-term) accumulated signal level; and
    setting the signal leakage rate equal to a prior signal leakage rate times one plus a leakage intensity factor in response to determining that the event classifier prediction score is not greater than the predetermined normal leakage rate and that the prior accumulated signal is not equal to the normal (long-term) accumulated signal level.

5. The method of claim 1, wherein
the generating an initial accumulated signal comprises computing a weighted sum of a prior accumulated signal and the event classifier prediction score in response to determining that the prior accumulated signal is less than a normal (long-term) accumulated signal level.

6. The method of claim 1, further comprising
generating a final accumulated signal by setting the final accumulated signal equal to the initial accumulated signal in response determining the initial accumulated signal is less than a normal (long-term) accumulated signal level and otherwise setting the final accumulated signal equal to a predetermined after-alert minimal signal level.

7. The method of claim 1, wherein
the event classifier prediction score is generated using one of a statistical analysis and a classifier model trained with a machine learning algorithm.

* * * * *